SHADOW MASK HAVING APERTURES PROGRESSIVELY TAPERED FROM CENTER TO PERIPHERY

Filed April 10, 1968 2 Sheets-Sheet 1

INVENTOR

HIDEO KUNIYOSHI

BY Louis Bernat

ATTORNEY

INVENTOR
HIDEO KUNIYOSHI
BY Louis Bernat
ATTORNEY 3,519,869

SHADOW MASK HAVING APERTURES PROGRESSIVELY TAPERED FROM CENTER TO PERIPHERY

Hideo Kuniyoshi, Tokyo, Japan, assignor to Victor Company of Japan Limited, Yokohama, Japan Filed Apr. 10, 1968, Ser. No. 720,059
Claims priority, application Japan, Apr. 11, 1967, 42/22,918, 42/22,919
Int. Cl. H01j *29/80, 1/52, 29/41*
U.S. Cl. 313—85 2 Claims

ABSTRACT OF THE DISCLOSURE

A color television picture tube of the post-acceleration shadow-mask type comprises a phosphor dot screen mounted on the front surface of the tube. A shadow-mask, formed with a plurality of apertures, is positioned between the phosphor screen and an associated electron gun. A frame-like electrode is mounted on the inner circumferential surface of a funnel-like portion of the glass picture tube. A power source supplies different voltages to the phosphor dot screen, the shadow-mask and the frame-like electrode. The cross-sectional shape of apertures formed in the shadow-mask is varied progressively in going from the center of the shadow-mask toward its periphery so that the electron beams may not impinge on the inner walls of the apertures of the shadow-mask.

The present invention relates to color television picture tubes, and in particular the invention provides improvements in or relating to color television picture tubes of the post-acceleration shadow-mask type. A post-acceleration electric field is created between a shadow-mask and phosphor dot screen so that an emitted electron beam can be post-accelerated and converged to strike the phosphor dot screen.

In general, many image characteristics of a shadow-mask type color television picture depend on the shadow-mask used.

The ease with which the colorimetric purity of an image can be maintained depends on the ratio of the diameter of the phosphor dots to the diameter of the electron beams passing through the apertures of the shadow-mask. If the phosphor dots and the electron beams had the same diameter, a slight deflection in the paths of the beams might degrade the colorimetric purity of images. Actually, however, the electron beams have a diameter which is smaller than the diameter of the phosphor dots, and predetermined allowances are provided to accommodate deflections of the electron beams so as to prevent degradation of colorimetric purity.

Thus, only those portions of the electron beams that pass through the apertures of the shadow-mask strike the phosphor dot screen. Those portions of the electron beams that impinge on portions of the shadow-mask other than the apertures are wasted. Also unnecessary heat generated in the shadow-mask causes it to expand, thereby degrading the colorimetric purity of images.

It is thus desirable to increase, as much as possible, the proportion of the electron beam energy that passes through the apertures in the shadow-mask to the beam energy that is prevented from passing therethrough. If, however, the diameter of the apertures is increased without paying any attention to the pitch of the apertures, in order to increase the proportion of energy passing through the shadow-mask, a mixture of color will inevitably occur. Thus, it is not possible to increase the diameter of the apertures without limits.

When ordinary shadow-mask types of color television picture tubes are used, there tends to be a greater color mixture near the periphery of a picture than near the center thereof. In order to overcome this defect, attempts have hitherto been made to produce a shadow-mask having apertures which become increasingly smaller in going from the center of the shadow-mask toward its periphery. This is what is termed a "graded hole mask."

When the electron beam impinges on the inner walls of the apertures of shadow-mask, the electrons are generally reflected, and they strike the phosphor dot screen in the form of irregularly diffused electrons. In order to prevent the electron beams from impinging on the inner walls of the apertures of shadow-mask, attempts have been made to produce a shadow-mask in which the apertures are frusto-conical in form throughout the entire surface of the shadow-mask. Also, the apertures are sometimes formed so that the diameter on the electron beam exit side of the apertures is made properly larger than the diameter on the electron beam entrance side.

When these prior art shadow-masks are used with the color television picture tubes of the post-acceleration shadow-mask type, an equipotential surface is created in an electric field between the shadow-mask and the phosphor dot screen. This surface exerts an influence on the electron beam entrance side of the apertures of the shadow mask. The secondary electrons produced by the portions of the electron beams impinging on the rear surface (electron beam entrance side) of the shadow-mask are drawn to the phosphor dot screen, thereby degrading the contrast and colorimetric purity of images. The picture obtained would thus be greatly degraded.

The present invention obviates this disadvantage. According to the invention, there are provided improvements as subsequently to be described in shadow-masks adapted for use with color television picture tubes of the post-acceleration shadow-mask type in order to prevent deleterious influences to be exerted on the images by the secondary electrons produced by the shadow-masks.

Accordingly, the principal object of the present invention is to provide a color television picture tube which can achieve improved contrast and colorimetric purity of the images.

Another object of the invention is to provide a color television picture tube which can prevent deleterious influences to be exerted on the images by the secondary electron produced by the shadow mask.

A further object of the invention is to provide a color television picture tube in which the cross-sectional shape of the apertures of the shadow-mask is progressively varied in going from the center of the shadow-mask toward its periphery. These shapes are such that the electron beams will not impinge on the inner walls of the apertures of shadow-mask.

These and other objects as well as advantages of the present invention will become apparent from a consideration of the following description when taken in conjunction with the accompanying drawings, in which.

Figure 1:
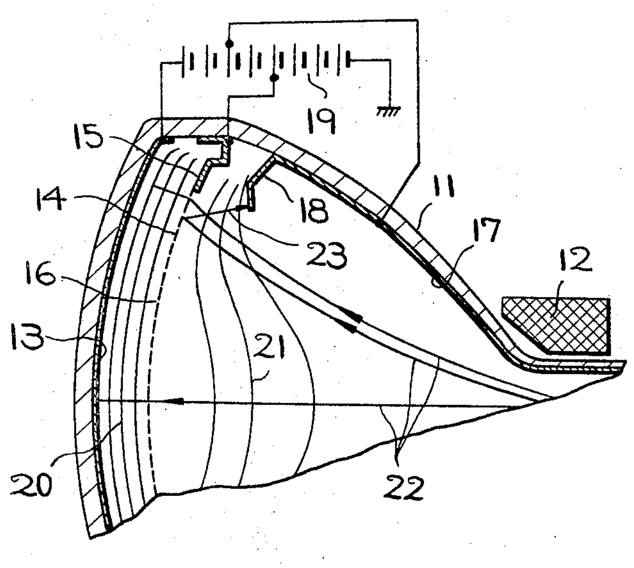
FIG. 1 is a longitudinal sectional schematic side view of a color television picture tube which is constructed according to this invention.

To enable the invention to be clearly understood, two preferred embodiments of the invention will now be described by way of example with reference to the drawings. The color television picture tube shown in FIG. 1 is one embodiment of a color television picture tube of the post-acceleration, shadow-mask type which is constructed according to this invention. In FIG. 1, the reference numeral 11 identifies a casing, formed of glass, of the color television picture tube. A deflection coil is shown at 12. A phosphor dot screen 13 comprises a phosphor surface provided with tri-color phosphor dots of red, blue and green. This surface is mounted on a transparent conducting electrode, such as metal back disposed on the front surface of a panel portion of said tube. The tri-color phosphor dots are formed by an electron beam printing process or other known processes. A shadow-mask 14 will subsequently be described in detail. A mounting member 15 is used for mounting the shadow-mask 14 on the peripheral surface on the panel portion of the tube. The reference numeral 16 designates one of a plurality of apertures formed on the entire surface of the shadow-mask 14 (the shapes of these apertures 16 are subsequently to be described in detail). A frame-like electrode 17 has a projecting annular edge portion 18 in its periphery, and it is mounted on the inner circumferential surface of the funnel-shaped portion of said tube. The projecting annular edge portion 18 is positioned in face to face relation with the rear surface (the electron beam entrance side) of the shadow-mask 14.

A power source 19 is used for supplying an electric power to the phosphor dot screen 13, the shadow-mask 14, and the frame-like electrode 17. The electric potential supplied to the phosphor dot screen 13 is at the highest level of all the potentials supplied by the power source. The electric potential supplied to the shadow-mask 14 is at the lowest level. The electric potential supplied to said frame-like electrode 17 is at a level slightly higher than that of the potential supplied to said shadow-mask. The voltages supplied to the phosphor dot screen 13, the shadow-mask 14 and the frame-like electrode 17 are approximately 20 kv., 12.6 kv. and 13 kv., respectively, in one embodiment of the invention.

The three lines 20 designate equipotential layers of a substantially uniform electric field formed across the entire surface of the shadow-mask 14 in a space between the phosphor dot screen 13 and the front surface (the electron beam exit side) of the shadow-mask. The three lines designate equipotential layers of an electric field formed on the side of the rear surface of the shadow-mask 14. The intensity of the electric field represented by lines 21 is relatively weaker in the center and relatively stronger in the periphery of the screen. The lines 22 designate tri-color electron beams emitted by an electron gun assembly (not shown) and deflected by said deflection coil 12. The arrow 23 designates the secondary electrons produced when the electron beams 22 impinge on the rear surface of the shadow-mask 14.

Figure 2:
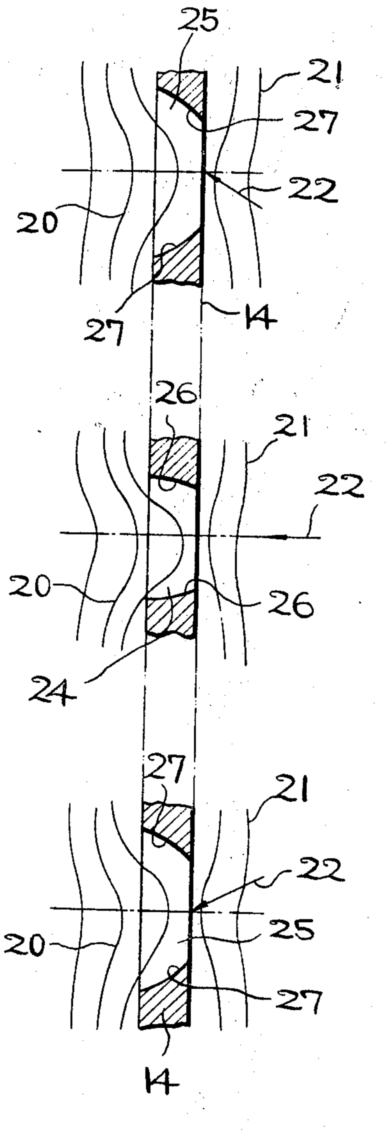
FIG. 2 is an enlarged longitudinal sectional schematic side view showing the apertures in one embodiment of a shadow-mask used in a color television picture tube which is constructed according to this invention.
Figure 3:
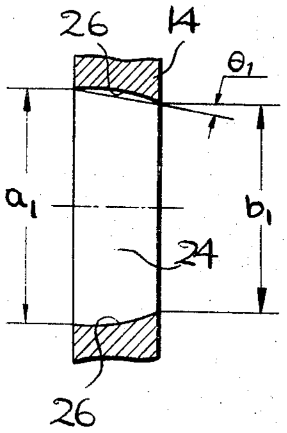
FIG. 3 is an enlarged longitudinal sectional schematic side view showing the shape of an aperture near the center of the shadow-mask of FIG. 2.
Figure 4:
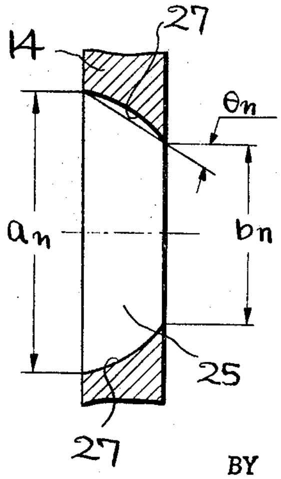
FIG. 4 is an enlarged longitudinal sectional schematic side view showing the shape of an aperture near the periphery of the shadow-mask of FIG. 2.

The color television picture tube of the post-acceleration shadow-mask type constructed in the manner described above and incorporating therein a shadow-mask illustrated in FIGS. 2, 3 and 4 will now be explained. In FIGS. 2 and 3, the reference character 24 represents apertures disposed near the center of the shadow-mask 14, while the reference numeral 25 identifies apertures disposed near the periphery of the shadow-mask. The arrows 22 in FIG. 2 indicate the directions in which the electron beams are incident upon the shadow-mask 14.

The apertures 24 which are disposed near the center of the shadow-mask 14 have inner walls 26 which have a very small angle of inclination $\theta_1$, such as approximately 8° 32′. The diameter of the apertures on the electron beam entrance side $b_1$ is approximately 370$\mu$, and the diameter of the apertures on the electron beam exit side $a_1$ is approximately 415$\mu$. In the apertures 25, which are disposed near the periphery of the shadow-mask 14 or approximately 80 mm. from the center thereof, the inner walls 27 have an angle of inclination $\theta_n$. This angle $\theta_n$ is much larger than the angle of inclination $\theta_1$. The angle of inclination $\theta_n$ is approximately 29° 15′ in the embodiment shown. The diameter of the apertures 25 on the electron beam entrance side $b_n$ is approximately 315$\mu$, and the diameter of the apertures 25 on the electron beam exit side $a_n$ is approximately 483$\mu$.

Figure 5:
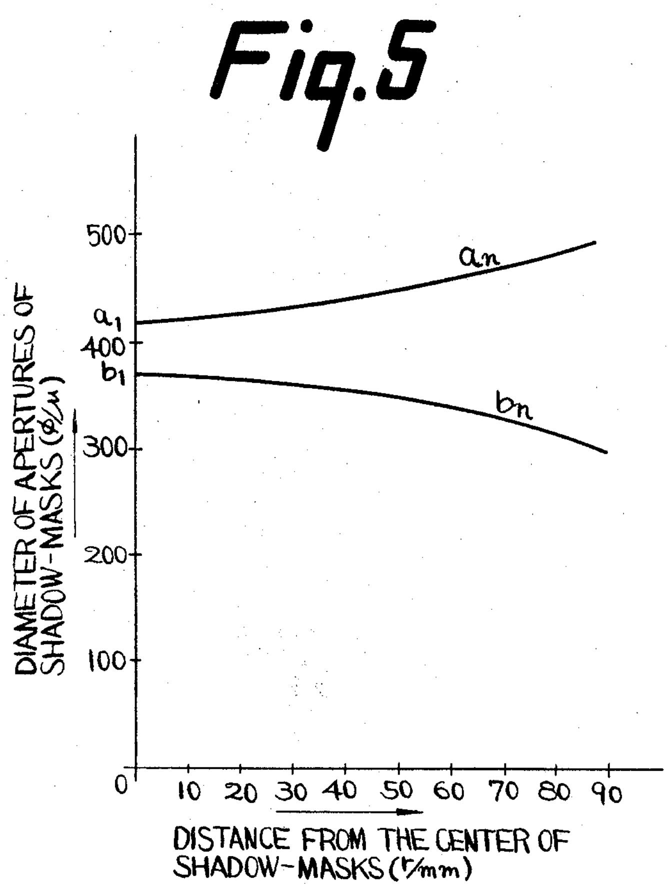
FIG. 5 is a diagram showing the relationship between the diameters of apertures of the shadow-mask and the distances from the center of the shadow-mask to the apertures.

As clearly seen in FIG. 5, the diameter of the apertures on the electron beam entrance side progressively decreases in going from the center toward the periphery of the shadow-mask. The diameter of the apertures on the electron beam exit side progressively increases in going from the center toward the periphery of the shadow-mask. Thus, the angle of inclination of the inner walls of apertures increases in going from the center toward the periphery.

In the arrangement described, the equipotential layers 20 and 21 of the electric fields produced on the sides of front and rear surfaces of the shadow-mask 14 will be disposed as shown in FIG. 2. It is to be noted that the angle of inclination of the inner walls 26 of the apertures 24 near the center of the shadow-mask 14 is so small that it is difficult for the equipotential layers 20 to enter deep into the apertures.

This inability of the layers 20 to penetrate the apertures prevents the electric field created in the space between the phosphor dot screen 13 and the shadow-mask 14 from exerting a substantial influence on the electron beam entrance side of the apertures 24. Consequently, the electric field created by the frame-like electrode 17 prevents the secondary electrons produced on the rear surface of the shadow-mask 14 from being drawn through the apertures and onto the phosphor dot screen 13. The field of electrode 17 is greatest at the periphery of the shadow-mask where the inner walls of the apertures 25 have a very large angle of inclination. The electric field of electrode 17 is smallest near the center of the shadow-mask 14 where the inner walls of the apertures 24 have a very small angle of inclination. The intensity of the electric field created by the frame-like electrode 17 is weaker near the center of the shadow-mask 14 where there are fewer secondary electrons than near the periphery thereof where there are more electrons. Thus, the secondary electrons are prevented from being drawn onto the phosphor dot screen 13 near the periphery and the center of the shadow mask, too.

Moreover, the inner walls 26 of the apertures 24 near the center of the shadow-mask need not have a large angle of inclination, since there is little danger of the electron beams 22 impinging on the inner walls because of the fact that the electron beams are incident on the shadow-mask substantially at right angles thereto.

It is evident from the curves shown in FIG. 5, that the relation between the intensity of the electric fields and the angle of inclination of the inner walls of the apertures prevents secondary electrons from reaching the phosphor screen. Also, in that portion of the shadow-mask 14 which is intermediate between the center portion and the peripheral portion, the secondary electrons can be prevented by the present invention from being drawn onto the phosphor dot screen 13 in the intermediate portion.

In the embodiment described, the proportion of the portions of the electron beams passing through the apertures to the portions that are prevented from passing therethrough is approximately 27% near the center of the shadow-mask and approximately 20% near the periphery thereof, with the apertures having a transverse pitch of approximately 670μ.

The color television picture tube of the post-acceleration shadow-mask type described above which incorporates therein a shadow-mask 14 illustrated in FIGS. 6, 7 and 8 will now be explained.

Figure 6:
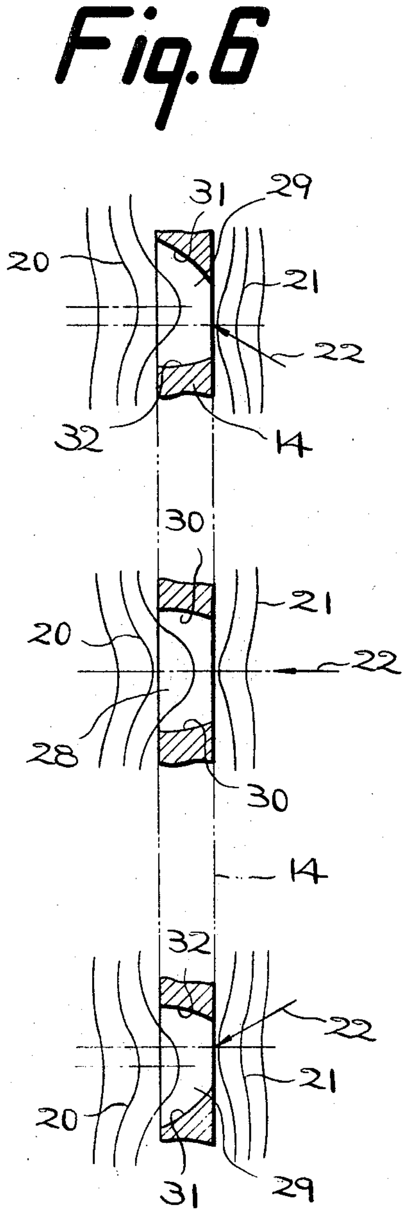
FIG. 6 is an enlarged longitudinal sectional schematic side view showing essential portions of another embodiment of a shadow-mask used with a color television picture tube which is constructed according to this invention.
Figure 7:
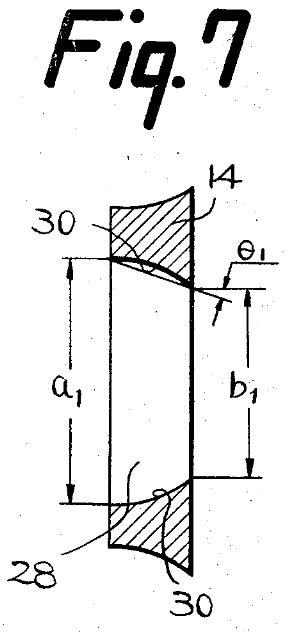
FIG. 7 is an enlarged longitudinal sectional schematic side view showing the shape of an aperture near the center of the shadow-mask of FIG. 6.
Figure 8:
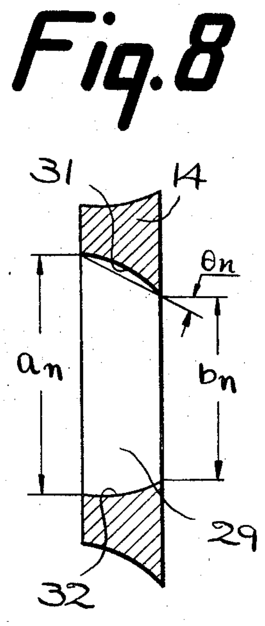
FIG. 8 is an enlarged longitudinal sectional schematic side view showing the shape of an aperture near the periphery of the shadow-mask of FIG. 6.

In FIGS. 6 and 7, apertures 28 are near the center of the shadow-mask 14. In FIGS. 6 and 8, apertures 29 are near the periphery thereof. The arrows in FIG. 6 indicate the directions of incidence of the electron beams 22 upon the shadow-mask 14.

The inner walls 30 of the apertures 28 near the center of the shadow-mask 14 have a very small angle of inclination $\theta_1$ which is approximately 18° 30′ in the embodiment shown. The diameter of the apertures 28 on the electron beam entrance side $b_1$ is approximately 350μ, and the diameter of the apertures 28 on the electron beam exit side $a_1$ is approximately 450μ.

One inner wall 31 of the apertures 29 disposed near the periphery of the shadow-mask 14 (or approximately 80 mm. from the center thereof) has an angle of inclination $\theta_n$ which is much larger than the angle of inclination $\theta_1$. The angle of inclination $\theta_n$ being approximately 26°35′ in the embodiment shown. The diameter of the apertures 29 on the electron beam entrance side $b_n$ is approximately 350μ, and the diameter thereof on the electron beam exit side $a_n$ is approximately 450μ. In the embodiment described, the values of $a_1$ and $a_n$ are shown as being equal and the values of $b_1$ and $b_n$ are shown as being equal. However, the apertures are formed such that the center of the apertures on the electron beam exit side is progressively shifted toward the center of the shadow-mask 14 in going from the center of the shadow-mask toward the periphery thereof. A result is that the angle of inclination of the inner wall of the aperture grows increasingly larger in going from the center of the shadow-mask toward the periphery thereof.

It is evident that, since the electron beams 22 are incident upon the shadow-mask 14 substantially at right angles thereto near the center thereof, there is no danger of the electron beams 22 impinging on the inner walls 30 of the apertures 28 even if the inner walls 30 do not diverge outwardly at a greater angle of inclination.

Near the periphery of the shadow-mask, the angles of incidence of the electron beams 22 upon the shadow-mask 14 are not 90°. The angles vary from one another depending on the location, so that the one inner wall 31 nearer the periphery of the shadow-mask 14 is tapered outwardly at a greater angle of inclination than the other inner wall 32. This prevents the electron beams 22 from impinging on said one inner wall. The angle of inclination of the other inner wall 32 or the inner wall nearer the center of the shadow-mask 14 is not so large. There is no danger of the electron beams 22 impinging on the other inner wall 32 even if the inner wall 32 is not tapered outwardly at a greater angle than is shown. The electron beams 22 are incident upon the shadow-mask at angles other than 90°, and the angles of incidence vary from one another depending on the location near the periphery of the shadow-mask.

In the embodiment of FIGS. 6 and 7, the voltages supplied to the phosphor dot screen 13, the shadow-mask 14 and the frame-like electrode 17 are approximately 20 kv., 7.5 kv. and 8 kv. respectively.

In the arrangement described, the equipotential layers 20 and 21 of the electric fields produced on the sides of front and rear surfaces of the shadow-mask 14 will be as shown in FIG. 6. It is to be noted that the angle of inclination of the inner walls 30 of the apertures 28 near the cetner of the shadow-mask 14 is so small that it is difficult for the equipotential layers 20 to enter deep into said apertures. This prevents the electric field produced in the space between the phosphor dot screen 13 and the shadow-mask 14 from exerting influences on the electron beam entrance side of the apertures 28. Consequently, there is no danger of the secondary electrons 23 being drawn onto the phosphor dot screen 13 even if the intensity of the electric field created on the side of the rear surface of the shadow-mask 14 is lower in the center than in the periphery.

The diameter of the opening on the electron beam exit side of the apertures 29 near the periphery of the shadow-mask 14 is smaller in the embodiment of FIG. 6 than the diameter in the embodiment of FIG. 2 where both inner walls of the apertures 25 are tapered outwardly. Thus, the influence exerted by the electric field between the phosphor dot screen 13 and the shadow-mask 14 on the electron beam entrance side of the apertures 29 can be minimized. As shown in FIG. 1, the intensity of the electric field created by the frame-like electrode 17 is higher in the periphery than in the center, so that said electric field has the action of drawing the secondary electrons 23 away from the phosphor dot screen 13. This action of the electric field and the aforementioned arrangement of the apertures 29 is conducive to preventing the secondary electrons 23 from being drawn onto the phosphor dot screen 13.

The foregoing description refers to the apertures in the center and periphery of the shadow-mask 14. In the portion of the shadow-mask intermediate between the center and the periphery, the angle of incidence of the electron beams on the shadow-mask 14 progressively varies depending on the location, so that the angle of inclination of one inner wall (nearer the periphery of the shadow-mask) of the apertures in the intermediate portion of the shadow-mask 14 can be made smaller than the inner wall 31 of the apertures 29 near the periphery of the shadow-mask 14. Thus, said one inner wall can be formed such that its angle of inclination grows smaller in going from the periphery of the shadow-mask 14 toward the center thereof.

With a transverse pitch of approximately 540μ for every aperture, the proportion of the portions of the electron beams that pass through the apertures to the portions that are prevented from passing therethrough is approximately 38% over the entire surface of the shadow-mask in this embodiment.

The apertures of the shadow-mask described with reference to the preferred embodiments of the invention are formed by a known photo etching process. The details of the process of forming same shall be omitted.

It is to be understood that while the present invention has been shown and described with reference to the preferred embodiments thereof, the invention is not limited to the precise form of the embodiments, and that various modifications and changes may be made therein without departing from the spirit an scope of the present invention.

What I claim is:

1. A somewhat funnel-shaped color television picture tube of the post-acceleration shadow mask type comprising an electron gun assembly means, a phosphor dot screen mounted on a front surface of said tube, said phosphor being illuminated by impingement of electron beams emitted by said electron gun assembly means, a shadow mask having a plurality of apertures formed therein, a frame-like electrode mounted on the inner circumferential surface of the funnel-shaped portion of the tube, the periphery of said electrode including a projecting annular edge portion positioned in face-to-face relationship with said shadow mask, and a power source means for supplying three potentials respectively to said phosphor dot screen, said shadow mask, and said frame-like electrode, the potential supplied to said phosphor dot screen being highest of the three potentials, the potential supplied to said shadow mask being lowest of the three potentials, the potential supplied to said frame-like electrode being slightly higher than the potential supplied to said shadow mask, the diameter of the apertures on the electron beam entrance side of said shadow mask progressively decreasing in going from the center of the shadow mask toward the periphery thereof and on the electron beam exit side of said shadow mask progressively increasing in going from the center of the shadow mask toward the periphery thereof, and the cross-sectional shapes of the apertures being such that there is a small angle of inclination of the inner walls of the apertures disposed near the center of the shadow mask, the angle increasing progressively in going from the center of the shadow mask toward the periphery thereof so that the electron beams may not impinge on the inner walls of the apertures.

2. The color television picture tube claimed in claim 1 wherein the cross-sectional shapes of the apertures of the shadow mask are such that there is a small angle of inclination of the inner walls of the apertures disposed near the center of the shadow mask, the angle of inclination of one part of the wall of the apertures becoming increasingly larger in going from the center of the shadow mask toward the periphery thereof, said one part being disposed nearer the periphery of the shadow mask than the other part of the inner wall of the apertures.

References Cited

UNITED STATES PATENTS

| | | |
|---|---|---|
| 2,663,821 | 12/1953 | Law. |
| 2,750,524 | 6/1956 | Braham. |
| 2,806,165 | 9/1957 | Law. |
| 2,947,899 | 8/1960 | Kaplan. |
| 2,951,179 | 8/1960 | Evans. |
| 2,971,117 | 2/1961 | Law. |
| 3,231,380 | 1/1966 | Law. |
| 3,398,309 | 8/1968 | Kaplan. |

ROBERT SEGAL, Primary Examiner

U.S. Cl. X.R.

313—92, 349; 315—16

---

UNITED STATES PATENT OFFICE

CERTIFICATE OF CORRECTION

Patent No. 3,519,869 July 7, 1970

Hideo Kuniyoshi

It is certified that error appears in the above identified patent and that said Letters Patent are hereby corrected as shown below:

Column 1, line 9, "22,918" and "22,919" should read -- 22,618 -- and -- 22,619 --, respectively. Column 6, line 2, "cetner" should read -- center --; line 59, "an" should read -- and --.

Signed and sealed this 19th day of January 1971.

(SEAL)

Attest:

Edward M. Fletcher, Jr.

Attesting Officer

WILLIAM E. SCHUYLER, JR.

Commissioner of Patents

UNITED STATES PATENT OFFICE

CERTIFICATE OF CORRECTION

Patent No. 3,519,869 July 7, 1970

Hideo Kuniyoshi

It is certified that error appears in the above identified patent and that said Letters Patent are hereby corrected as shown below:

Column 1, line 9, "22,918" and "22,919" should read -- 22,618 -- and -- 22,619 --, respectively. Column 6, line 2, "cetner" should read -- center --; line 59, "an" should read -- and --.

Signed and sealed this 19th day of January 1971.

(SEAL)
Attest:

Edward M. Fletcher, Jr.
Attesting Officer

WILLIAM E. SCHUYLER, JR.
Commissioner of Patents